(12) United States Patent
Kuroda et al.

(10) Patent No.: US 6,801,374 B2
(45) Date of Patent: Oct. 5, 2004

(54) MOLDED LENS, SCANNING LENS, OPTICAL SCANNER AND IMAGE FORMING APPARATUS

(75) Inventors: Masaaki Kuroda, Ibaraki (JP); Osamu Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/307,990

(22) Filed: Dec. 3, 2002

(65) Prior Publication Data

US 2003/0112531 A1 Jun. 19, 2003

(30) Foreign Application Priority Data

Dec. 13, 2001 (JP) .......................................... 2001/379981
Sep. 27, 2002 (JP) .......................................... 2002/282350

(51) Int. Cl.$^7$ .............................. G02B 3/00; G02B 7/02
(52) U.S. Cl. ........................ 359/811; 359/652; 359/653; 359/654
(58) Field of Search ........................ 359/811, 652–654, 359/819; 396/526; 362/455; 353/100

(56) References Cited

U.S. PATENT DOCUMENTS

| 5,966,161 A | 10/1999 | Kato ........................... 347/258 |
| 6,081,386 A * | 6/2000 | Hayashi et al. ............. 359/641 |
| 6,565,346 B2 * | 5/2003 | Kanematsu et al. ........ 425/130 |
| 2001/0028134 A1 | 10/2001 | Kanematsu et al. ..... 264/328.1 |

FOREIGN PATENT DOCUMENTS

| JP | 8-15503 | 1/1996 |
| JP | 9-49976 | 2/1997 |
| JP | 10-278077 | 10/1998 |
| JP | 11-19956 | 1/1999 |
| JP | 2001-62870 | 3/2001 |

OTHER PUBLICATIONS

Optical Measurement Handbook, Published by Asakura Shobo Pulishing Company, First Impression of the First Edition, Editors Takoh, Tsujiuchi, and Minami, Copyright 1981.

* cited by examiner

Primary Examiner—Hung Xuan Dang
Assistant Examiner—Joseph Martinez
(74) Attorney, Agent, or Firm—Fitzpatrick, Cella, Harper & Scinto

(57) ABSTRACT

The present invention provides a plastic lens, used in an optical system of an optical image recording apparatus, which is low in birefringence, and is less susceptible to displacement of focus caused by resistance to environment. At least a part of a non-effective area is concave, and there is a sink mark in the concave portion. The shape of the concave portion is determined so as to achieve a GI ratio $(\Delta f/f0) \leq 5\%$.

11 Claims, 9 Drawing Sheets

MOLDED LENS, SCANNING LENS, OPTICAL SCANNER AND IMAGE FORMING APPARATUS

BACKGROUND OF THE INVENTION

1. Field of the Invention

The present invention relates to a molded lens used in an optical system of an optical image recording apparatus such as a camera, a facsimile machine, a laser beam printer or a copying machine. More particularly, the invention relates to a plastic lens used as a scanning optical element mounted in such an image forming apparatus.

2. Description of the Related Art

Figure 11:
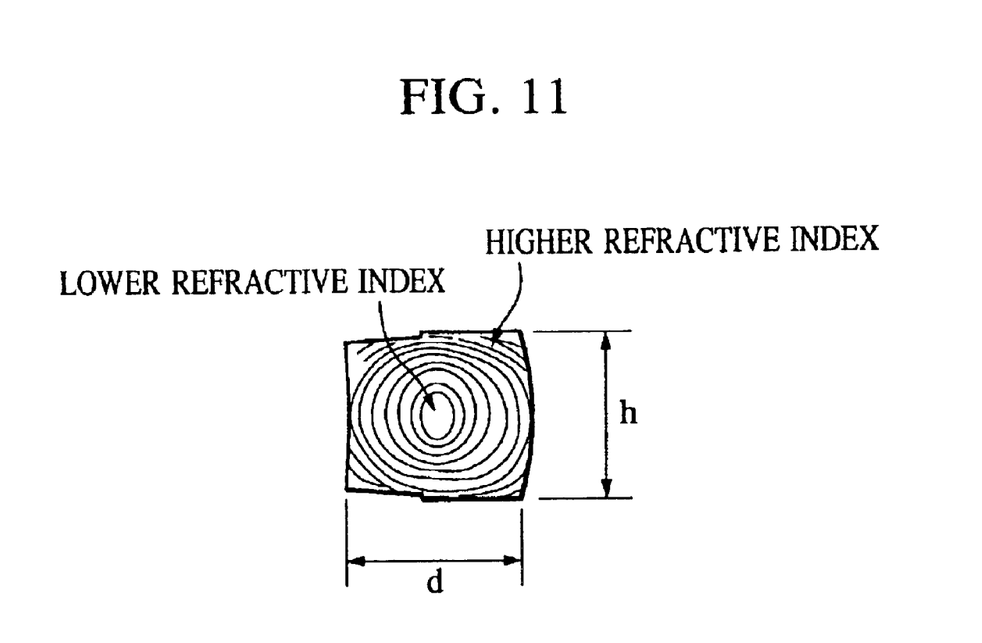
FIG. 11 is a schematic view illustrating a GI (refractive index distribution) state in the plastic lens.
Figure 12:
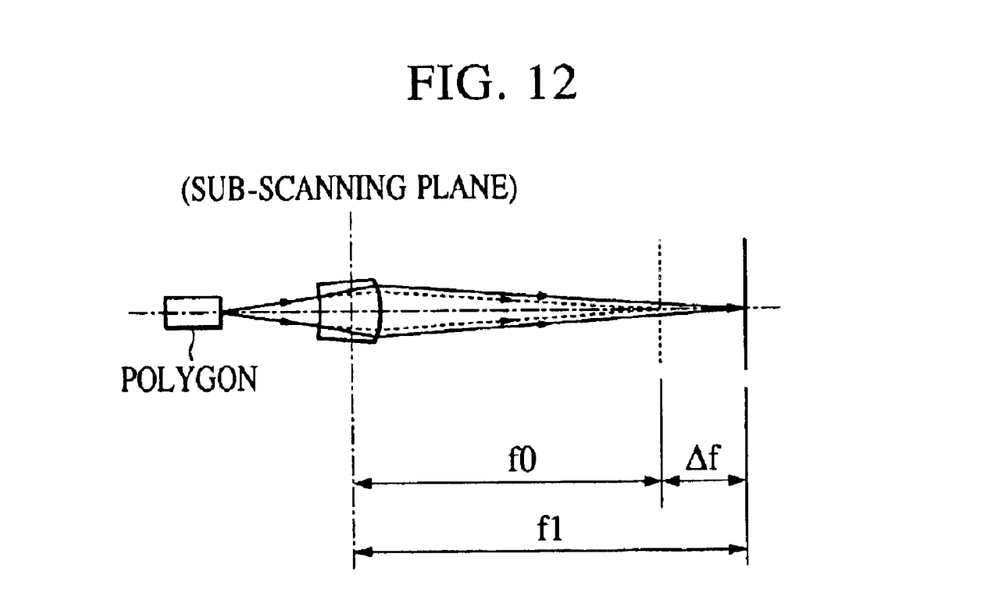
FIG. 12 is a schematic view illustrating a negative power caused by GI (refractive index distribution) in a plastic fθ lens in a laser scanning system.

For the plastic lens used in an optical system of an optical image recording apparatus, there is a demand for a lower birefringence and a lower GI (refractive index distribution). In an optical system of a laser beam printer which is an optical image recording apparatus, for example, birefringence of a plastic lens causes a bulge of the laser beam. As shown in FIG. 11, in a plastic lens, GI (refractive index distribution) is such that the refractive index is higher on the outer periphery than in the interior. The lens has therefore a negative power as shown in FIG. 12. Internal strain in the plastic lens is released as a result of secular change, and this causes release of GI (refractive index distribution), thus resulting in a displacement of focus.

FIG. 11 schematically illustrates a gradient of refractive index caused in an fθ lens as a result of a short molding time. The lens outer periphery in close contact with the mold while being formed is first cooled and solidified. The lens outer periphery has therefore a higher density than the interior of the lens. The refractive index of the lens is accordingly higher on the lens outer periphery than in the lens interior. The solid line in the lens shown in FIG. 11 represents an isoflux of the refractive index, suggesting that the refractive index is higher toward the lens outer periphery.

The above-mentioned displacement of focus results in deterioration of birefringence of a printed image of a laser printer. As counter-measures against this inconvenience, methods for reducing birefringence are conventionally proposed by Japanese Patent Laid-Open Nos. 11-19956 and 10-278077 (USSA 2001028134) and Japanese Patent 2001-62870. Methods for reducing GI (refractive index distribution) are proposed in Japanese Patent Laid-Open Nos. 8-15503 and 09-49976 (U.S. Pat. No. 5,966,161).

The following three means for reducing birefringence by producing a sink mark in a non-effective area of the plastic lens are proposed:
(1) Causing a sink mark by local heating by a heater during the cooling step;
(2) Causing a sink mark by forcedly releasing the resin from the mold by injecting air during the cooling step; and
(3) Causing a sink mark by forcedly releasing the resin from the mold by pulling out the mold core during the cooling step.

In the case of (1) above, however, a problem is encountered in that embedding the heater in the mold leads to a complicated mold structure. The case (2) requires an air channel in an air blower or the mold, resulting in complicated apparatus and operation. This method is low in forming stability since the amount of air injection or pressure leads to deterioration of the surface accuracy.

The case (3) requires a special mold core structure or a driving source such as an oil hydraulic cylinder for causing sliding of the mold core, resulting in complicated apparatus and operation.

As means for reducing GI (refractive index distribution), the portion having a high GI (refractive index distribution) is kept away from the flux effective area by providing a convex portion in the non-effective area of the plastic lens. In order to obtain this advantage, it is necessary to enlarge the convex portion relative to the thickness of the plastic lens in general, and the forming cycle cannot be reduced. This causes a problem in that the lens itself must be larger in size, thus leading to a higher cost.

It is therefore an object of the present invention to provide a plastic lens which permits reduction of the forming cycle and has reduced birefringence and GI (refractive index distribution).

SUMMARY OF THE INVENTION

To achieve the above-mentioned object, in a molded lens, such as a plastic lens of the present invention, a concave shape is provided at least in a part of a non-effective area through which an image forming flux does not pass.

According to the above-mentioned configuration, forming under a reduced pressure condition causes accumulation of heat in the concave portion in the non-effective area during the cooling step. This in turn causes a delay in cooling, thereby making it possible to selectively produce a sink mark. A sufficient transferability of the optical surface can therefore be ensured.

In portions other than the concave portion, a portion with a high GI (refractive index distribution) can be kept away from the flux effective area. It is therefore possible to inhibit deterioration of GI (refractive index distribution).

If the plastic lens has a center thickness d and a lens height h at the concave portion, achievement of a shape satisfying d>h permits reduction of the forming cycle because of the cooling of the concave portion.

Further objects, features and advantages of the present invention will become apparent from the following description of the preferred embodiments with reference to the attached drawings.

DESCRIPTION OF THE PREFERRED EMBODIMENTS

Figure 1:
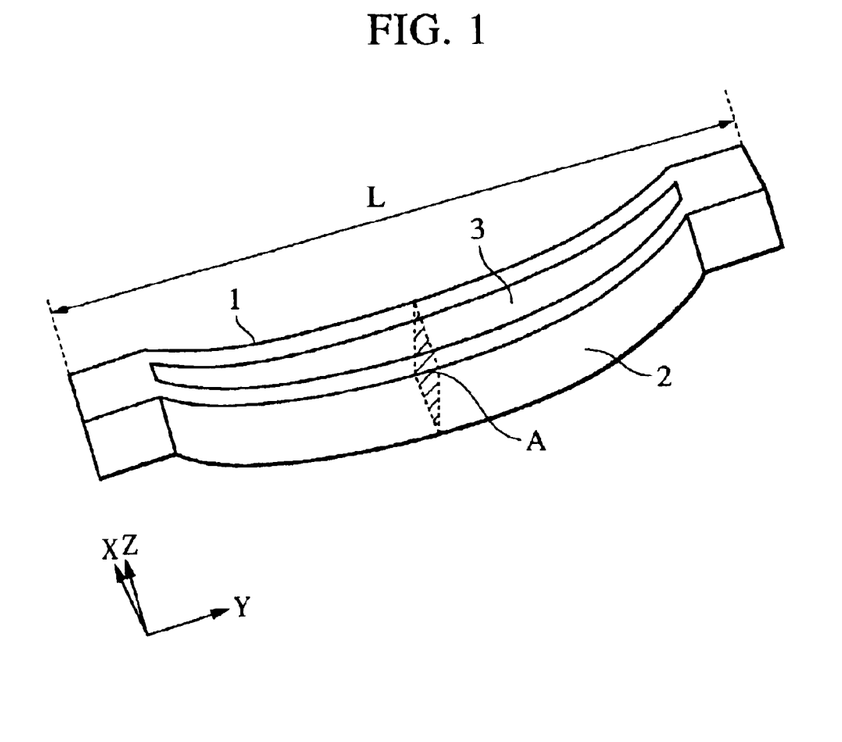
FIG. 1 is a perspective view of the plastic lens of the present invention.

Embodiments of the present invention will be described with reference to the drawings.
First Embodiment FIG. 1 is a perspective view of a long plastic lens of a first embodiment of the invention. More specifically, the plastic lens is formed in a mold shown in FIG. 2. The mold comprises a fixed die 8 and a movable die 5. The fixed die 8 has a mirror frame 10, and the movable die 5 has a mirror frame 9. Optical surfaces 1 and 2 are formed on a cavity 4. A concave portion 3 of the non-effective area is formed in the cavity 4 by a slide frame 6. When forming is carried out by reducing the retained pressure to a level producing a sink mark, the resin filling the cavity 4 is cooled by a medium passing through a water pipe via a mold member. Because the slide frame convex portion 11 is covered with the resin filling the cavity 4, containing accumulated resin heat, there is a delay in cooling of the concave portion 3 and a sink mark 12 is produced. On the other hand, occurrence of a sink mark 12 in the concave portion 3 in the non-effective area permits smooth progress of resin movement to the optical surface, thus improving transferability of the optical surface. The forming resin may be any of resins for optical purposes such as PMMA, PC and olefin-based resin.

Figure 3:
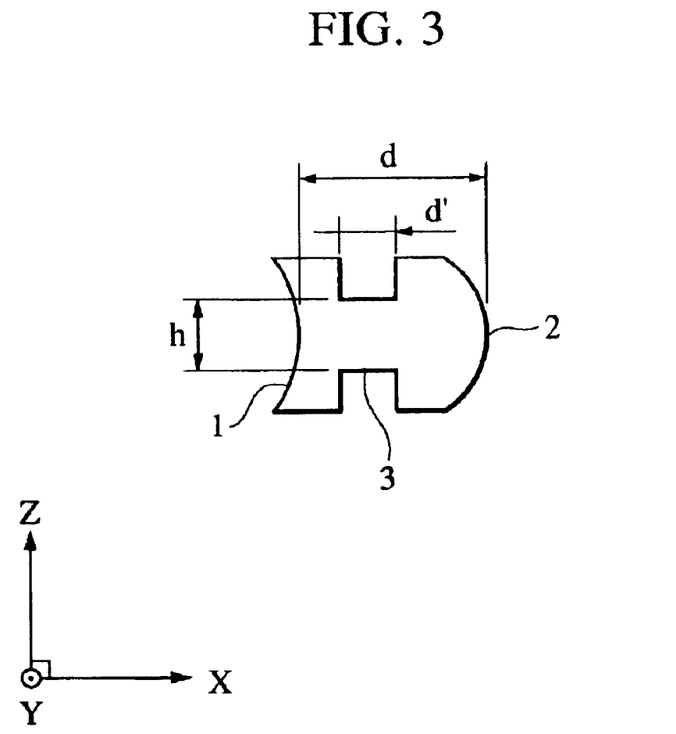
FIG. 3 is a sectional view of A shown in FIG. 1 of the plastic lens of the invention.
Figure 4:
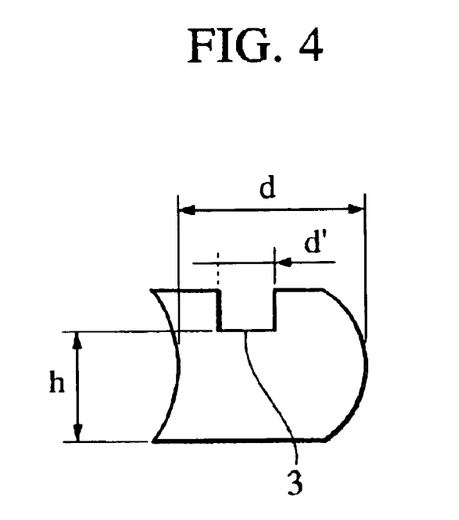
FIG. 4 is a sectional view of FIG. 1 of another plastic lens of the invention.
Figure 5:
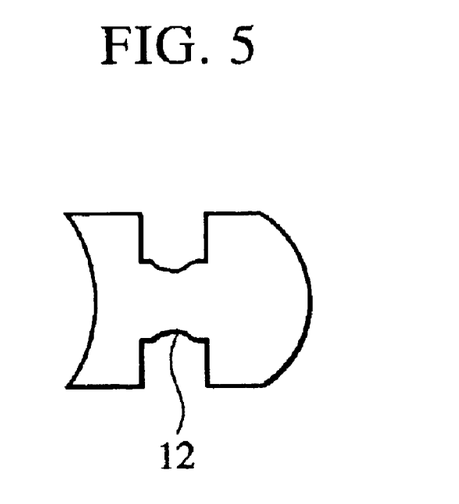
FIG. 5 is a sectional view illustrating a sink mark in the plastic lens shown in FIG. 3.

FIG. 3 is a sectional view of A in FIG. 1 illustrating a first embodiment of the present invention. As shown in FIG. 5, a sink mark 12 is produced in the concave portion 3 in the non-effective area shown in FIG. 3. FIG. 4 is a sectional view of A in FIG. 1 in another embodiment of the invention.

Figure 6:
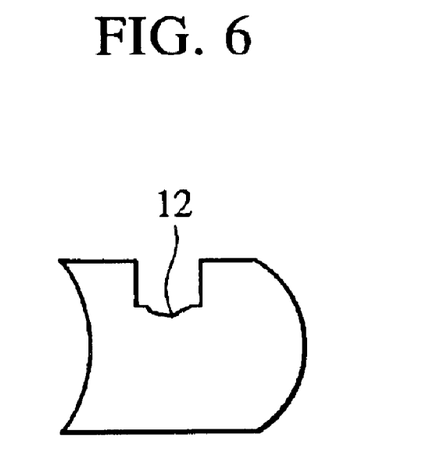
FIG. 6 is a sectional view illustrating a sink mark in the plastic lens shown in FIG. 4.

The concave portion 3 is present only on one side of the non-effective area, and the sink mark 12 occurs in the concave portion 3 of the non-effective area as shown in FIG. 6.

Figure 7:
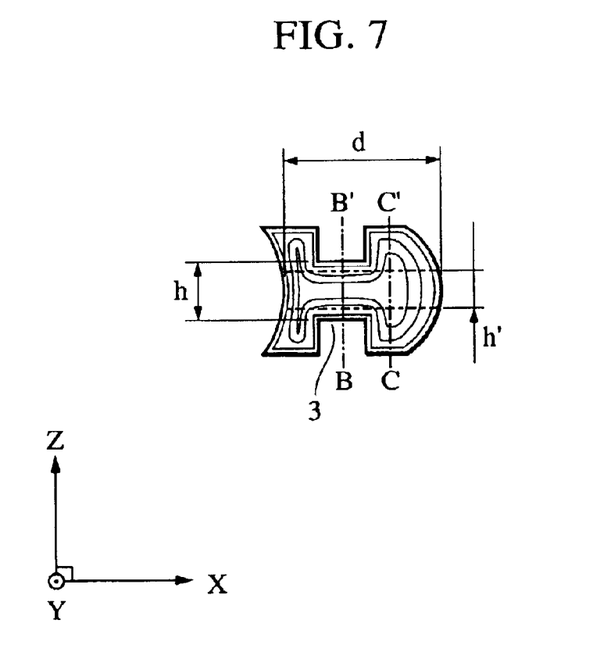
FIG. 7 is a schematic view illustrating a GI (refractive index distribution) state in the plastic lens shown in FIG. 3.
Figure 8:
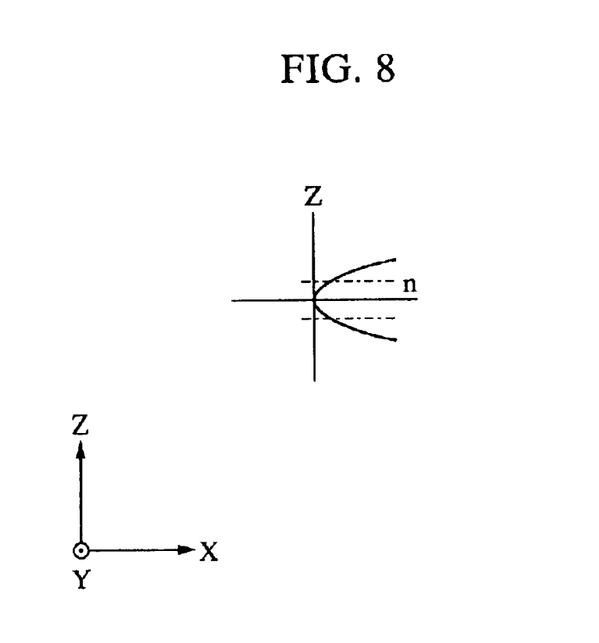
FIG. 8 is a graph illustrating a GI (refractive index distribution) state on the B–B' section of the plastic lens shown in FIG. 7.
Figure 9:
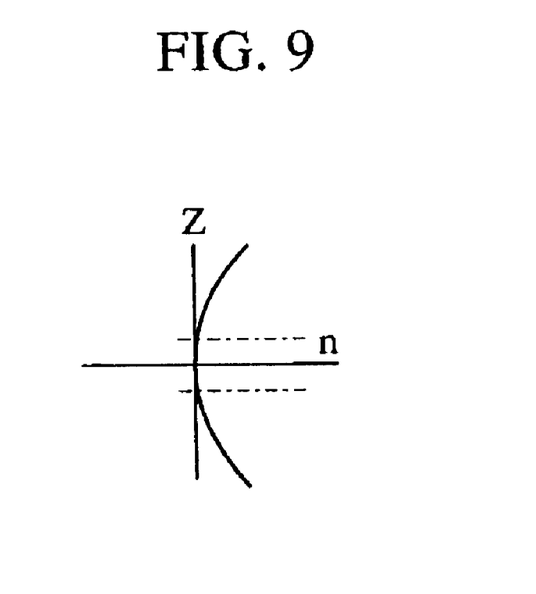
FIG. 9 is a graph illustrating a GI (refractive index distribution) state on the C–C' section of the plastic lens shown in FIG. 7.
Figure 10:
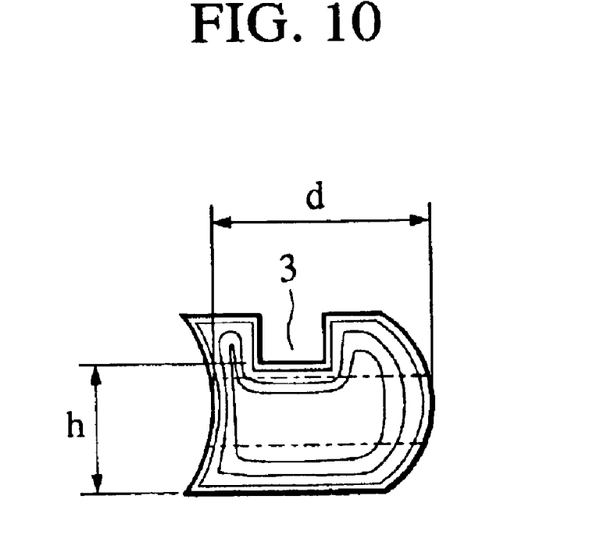
FIG. 10 is a schematic view illustrating a GI (refractive index distribution) state in the plastic lens shown in FIG. 4.

FIGS. 7 and 10 are schematic representations of GI (refractive index distribution) of the plastic lens of the invention. A resin filling a cavity is generally cooled from the outer periphery. The outer periphery of the formed shape has a higher refractive index. In the flux effective area h' through which an image forming flux passes, i.e., in the B–B' section shown in FIG. 7, GI (refractive index distribution) is high as shown in FIG. 8. In the other portions such as C–C' section, however, GI (refractive index distribution) is low as shown in FIG. 9. This is attributable to the fact that, in the C–C' section, the areas having a high GI (refractive index distribution) are outside the flux effective area. Since the amount of focal displacement is dependent on the accumulation of GI (refractive index distribution) values in the optical axis direction, it is possible to reduce the effect of GI (refractive index distribution) for the lens as a whole.

Dimensions d and h should preferably be determined so that the GI ratio (Δf/f0) is 5% or smaller. A GI ratio over this level leads to a larger amount of focal displacement, and hence to a decrease in image quality.

The parameters of the GI ratio (Δf/f0) will now be defined.

In FIG. 12, it is assumed that the focal length f0 in the direction of a line (sagittal line) perpendicular to the generating line, calculable from the curvature of the plastic lens surface, the refractive index of the material, and the thickness in the optical axis direction, and that the observed focal length in the direction of a line perpendicular to the generating line (meridional line) is f1. On this assumption, Δf is defined by |f1−f0|=Δf. The generating line direction (FIG. 13) is represented by Y. The length in the generating line direction of the plastic lens is expressed as L. The value of L is L=110 mm in this embodiment.

The plastic lens of this embodiment has a longer side in the generating line direction Y and a shorter side in the direction of the line perpendicular to the generating line.

In FIGS. 8 and 9, the ordinate Z represents the sub-scanning direction; the abscissa n represents the refractive index; and n has no unit.

In this case, the concave portion 3 of the non-effective area through which an image forming flux does not pass may have a sink mark or no sink mark.

As shown in FIGS. 3 to 6, the cooling time depends upon h, not upon the plastic lens thickness d, in the plastic lens satisfying the condition d>h, and this makes it possible to reduce the forming cycle.
Second Embodiment FIG. 13 is a partial sectional view in the main scanning direction of the optical scanner of the second embodiment of the present invention.

Figure 13:
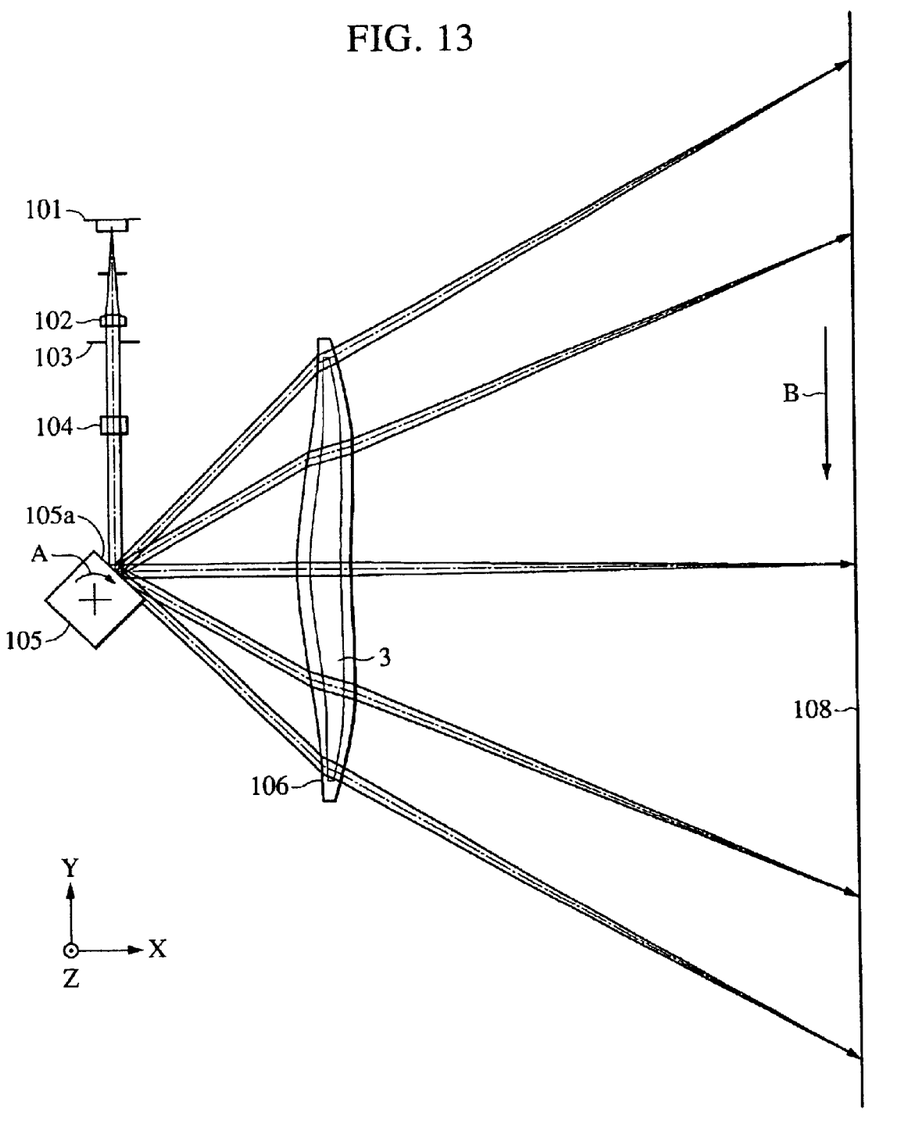
FIG. 13 is a main scanning sectional view of the optical scanner of the second embodiment.

In FIG. 13, 101 represents light source means comprising, for example, a semiconductor laser; 102, a collimator lens serving as part of an optical element, and converts a divergent flux (light beam) emitted from the light source means 101 into a convergent flux or a parallel flux; and 103, an opening stop which limits the transmitting flux (amount of light).

While a single flux is emitted from the light emitting section of the light source means 101, the light source means may have a light emitting section emitting two or more fluxes.

Reference numeral 104 represents a cylindrical lens serving as an optical element which has a prescribed refractive force only in a sub-scanning direction Z perpendicular to the paper of FIG. 13, and forms the flux having passed through the stop 103 into substantially a line image on a deflected surface of an optical deflector 105 described later within a sub-scanning cross-section. A first optical element is composed of the collimator lens 102 and the cylindrical lens 104.

Reference numeral 105 represents an optical deflector comprising, for example, a polygon mirror (a rotary polygon mirror) serving as a deflector element, which is rotated at a certain speed in the arrow A direction by driving means such as a motor (not shown).

Reference numeral 106 represents an fθ lens having a concave portion 3 formed in the non-effective area, comprising a single lens having fθ characteristics, serving as a second optical element (scanning optical system) (FIGS. 1 and 3). The fθ lens has a lens shape as described later and forms a flux based on image information deflection-reflected by the optical deflector 105 into an image on a photosensitive drum surface 108 which is a recording medium serving as a scanned surface, and corrects an inclination of the deflection surface 105a of the optical deflector 105. In the fθ lens 106 having the concave portion 3 formed in the non-effective area through which the scanning flux does not pass, a gradient of refractive index occurs.

The plastic fθ lens 106 of this embodiment is a long plastic lens having a longer side in the main scanning direction Y and a shorter side in the sub-scanning direction Z. The length in the main scanning direction Y of the plastic lens is expressed as L. In this embodiment, L=110 mm.

The fθ lens 106 which is the scanning lens composing the scanning optical system used in this embodiment has the concave portion 3 in the non-effective area through which the scanning flux does not pass, in the same shape as in FIGS. 1 and 3.

The fθ lens 106 in this embodiment is formed with a reduced lens height (h) relative to the center thickness (d) for the purpose of reducing the forming tact time as described above. As a result, as shown in FIG. 7 hereafter, a gradient of refractive index is produced in the interior of the fθ lens 106 at the sub-scanning cross-section. Because of this gradient of refractive index, the flux in the lens is pulled in the direction toward the lens outer periphery having a higher refractive index.

Since the fθ lens 106 is long within the main scanning cross-section, almost no strain occurs in the fθ lens. In general, because the fθ lens 106 is long as L=52 to 260 mm within the main scanning cross-section, the gradient of refractive index in the main scanning cross-section does not pose a problem so much as in the sub-scanning cross-section.

Figure 14:
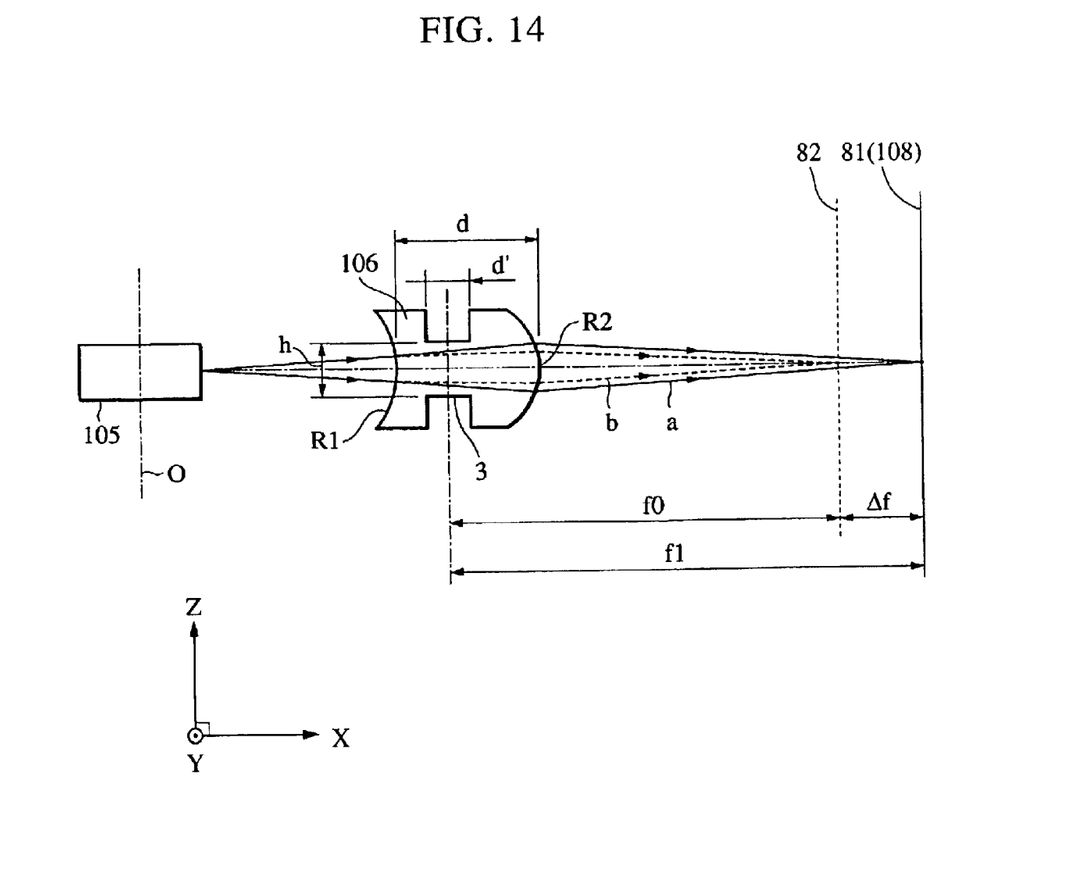
FIG. 14 is a sub-scanning sectional view of the optical scanner of the second embodiment.

FIG. 14 is a partial sectional view in the sub-scanning direction from the polygon mirror 105 to the photosensitive drum surface 108 of the optical scanner of the second embodiment of the invention. In FIG. 14, the same component elements as in FIG. 13 are represented by the same reference numerals.

Referring to FIG. 14, more specifically, within the sub-scanning cross-section, the concave portion 3 is formed in the flux non-effective area through which the scanning flux does not pass in the upper and lower parts.

As described above with reference to FIG. 11, as a result of the presence of the gradient of refractive index shown in FIG. 11, the focal length f0 in the sub-scanning direction Z (the direction of a line perpendicular to the generating line) calculable from the curvature of the lens surface of the fθ lens 106 which is the scanning lens, the refractive index of the material, and the thickness in the optical axis direction is shorter than the observed focal length f1 in the sub-scanning direction (the direction of the line perpendicular to the generating line).

In this embodiment, however, because the concave portion 3 is formed in the flux non-effective area in the sub-scanning cross-section of the fθ lens 106, the GI ratio (Δf/f0) becomes 5% or lower; Δf is defined as |f1−f0|=Δf.

In the plastic fθ lens 106, therefore, since the concave portion 3 is formed in the non-effective area through which the scanning flux does not pass as shown in FIG. 14, it is possible to inhibit the effect of GI (refractive index distribution) for the lens as a whole, and there is available an advantage of reducing focal displacement in the sub-scanning direction caused by the gradient of refractive index in the lens.

The focal length f0 of the fθ lens serving as the scanning lens is calculated from the curvature of the surface thereof, the refractive index of the material, and the thickness in the optical axis direction X. The focal length f1 of the fθ lens is actually measured by the nodal sliding method. The model sliding method is popularly applied for measuring focal length of optical parts as described in the Optical Measurement Handbook published by Asakura Shobo Publishing Co.

It is needless to mention that, in this embodiment, an fθ lens 106 having a concave portion 3 formed only in the upper flux non-effective area as shown in FIG. 4 may be applied.

An fθ lens 106 having a concave portion 3 formed only in the lower flux non-effective area may be applied.

In this embodiment, d=11 mm, d'=5.5 mm and h=7 mm.

It is desirable that d' and d satisfy the relationship d'/d≦0.8. The reason is that a d'/d greater than 0.8 leads to an increase of lens portion having a high GI, so that the GI ratio (Δf/f0) becomes greater than 5%.

The relationship 1>h/d≧0.2 should preferably be satisfied by d and h. An h/d under 0.2 results in an increase of lens portion having a high GI, so that the GI ratio (Δf/f0) exceeds 5%. An h/d greater than 1 leads to dependency of the forming cycle upon the center thickness d and makes it impossible to reduce the forming cycle.

When the fθ lens 106 has a center thickness d and a lens height h in the flux effective area within a sub-scanning cross-section perpendicular to the main scanning cross-section including the optical axis, a condition:

$$d > h$$

should be satisfied.

In this embodiment, the presence or absence of a sink mark 12 in the concave portion 3 in the non-effective area matters little.

A divergent flux emitted from a semiconductor laser 101 in this embodiment is converted by a collimator lens 102 into an convergent or parallel flux, and after limiting the flux (amount of light) through an opening stop 103, enters a cylindrical lens 104. A part of the flux incident on the cylindrical lens 104 is emitted as it is in the main scanning cross-section. In the sub-scanning cross-section, the flux becomes convergent and is formed into substantially a line image (line image long in the main scanning direction Y) on a deflection surface 105a of an optical deflector 105. The flux deflection-reflected on the deflection surface of the optical deflector 105 is introduced onto a photosensitive drum surface 108 via an fθ lens 106 having a concave portion 3 (FIGS. 1 and 3) formed in the non-effective area having a refractive force different between the main scanning direction Y and the sub-scanning direction Z, and optically scans in the arrow B direction the photosensitive drum surface 108 by rotating the optical deflector 105 in the arrow A direction, thereby recording the image.

In this embodiment, furthermore, by using a steeper curvature of the lens surface R2 on the photosensitive drum surface 108 side of the fθ lens 106 serving as a scanning lens, image displacement caused by this gradient of refractive index is cancelled. More specifically, by increasing the refractive force of the lens surface R2 on the photosensitive drum 108 surface side of the fθ lens 106, and placing a Gauss image surface 82 on the optical deflector 105 side, not on the photosensitive drum surface 108 side, an image displacement (focal displacement) in the sub-scanning direction caused by internal strain occurring upon plastic forming of the fθ lens is corrected to arrange a best image surface 81 leading to a minimum wave aberration on the photosensitive drum surface 108. This permits high-accuracy optical scanning. In FIG. 14, the solid line a represents the flux advancing toward the best image 81, and the broken line b, the flux running to the Gauss image 82.

The concave portion 3 is formed in the non-effective area through which the scanning flux does not pass as shown in FIG. 14 in the plastic fθ lens 106. The reason is as follows. In a configuration in which the scanning optical system is composed of only a single fθ lens 106 as shown in FIGS. 13 and 14, it is inevitable to form a concave portion 3 in the non-effective area of particularly the plastic fθ lens 106 through which the scanning flux does not pass as shown in FIG. 14.

For the purpose of limiting the optical properties such as the image surface curvature and deflection aberration in the main scanning direction, and image surface curvature in the sub-scanning direction and magnification of sub-scanning within desired ranges on the photosensitive drum 108 surface, it is unavoidable to increase the center thickness d of the fθ lens 106. This inevitably leads to a longer forming tact time upon injection molding, and hence to a problem of a higher manufacturing cost in mass production.

A concave portion 3 is therefore formed in the non-effective area through which the scanning flux does not pass of the fθ lens as shown in FIG. 14, thereby reducing the forming tact time.

The scanning optical system of this embodiment comprises a single plastic fθ lens 106. The present invention is applicable also to an optical system comprising two or more plastic fθ lenses in which concave portions 3 are formed in the non-effective areas within the sub-scanning cross-section.

Apart from the plastic fθ lens, the scanning optical system of the invention may contain a polished glass fθ lens.

The scanning optical system containing the plastic fθ lens (refractive optical element) having a concave portion 3 formed in the non-effective area within the sub-scanning cross-section may contain a scanning optical element other than a refractive optical element such as a powered reflecting mirror or a diffraction optical element.

In this embodiment, furthermore, the plastic fθ lens shown in FIG. 14 having the concave portion 3 formed in the non-effective area in the sub-scanning cross-section has a positive power. When the scanning optical system containing a plastic fθ lens (refractive optical element) having the concave portion 3 formed in the non-effective area is composed of two or more scanning optical elements (a lens which is a refractive optical element, a diffraction optical element, a powered reflecting mirror, etc.), even if a negatively powered plastic fθ lens (refractive optical element) is present in the sub-scanning cross-section, the flux can form an image on the surface to be scanned 108 only if the power in the sub-scanning cross-section is positive for the scanning optical system as a whole.

The present invention is therefore applicable also to a configuration in which the concave portion 3 is formed in the non-effective area of the negatively powered plastic fθ lens (refractive optical element) within the sub-scanning cross-section.

Even when the fθ lens which is a plastic scanning lens is negatively powered in the sub-scanning cross-section, formation of the concave portion 3 in the non-effective area through which the scanning flux does not pass as shown in FIG. 7 makes it possible to reduce the influence of the gradient of refractive index in the lens and obtain the advantage of reducing the displacement of focus in the sub-scanning direction.

Figure 2:
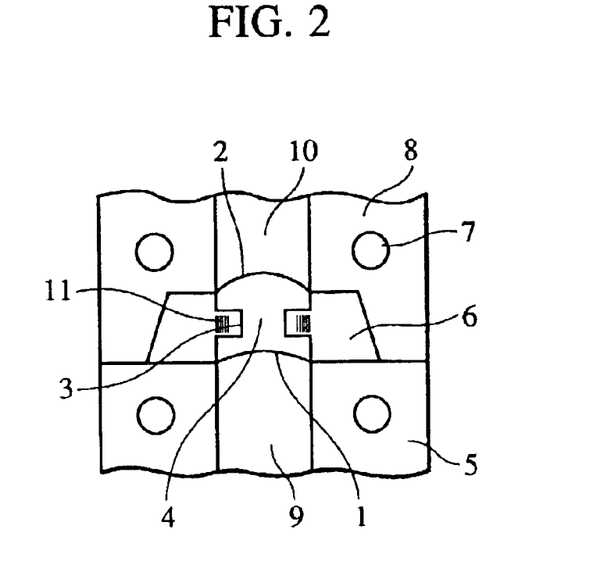
FIG. 2 is a sectional view of the mold for forming the plastic lens of the invention.

In the first and second embodiments described above, in order to reduce a change in focus in the sub-scanning direction caused by the gradient of refractive index of the plastic lens formed by injection molding as shown in FIG. 2, the concave portion 3 is formed in the non-effective area through which the scanning flux does not pass in the sub-scanning cross-section. Although the present invention is not limited to a plastic lens, the invention is applicable to mold lenses formed by mold injection including plastic lenses.

[Image Forming Apparatus]

Figure 15:
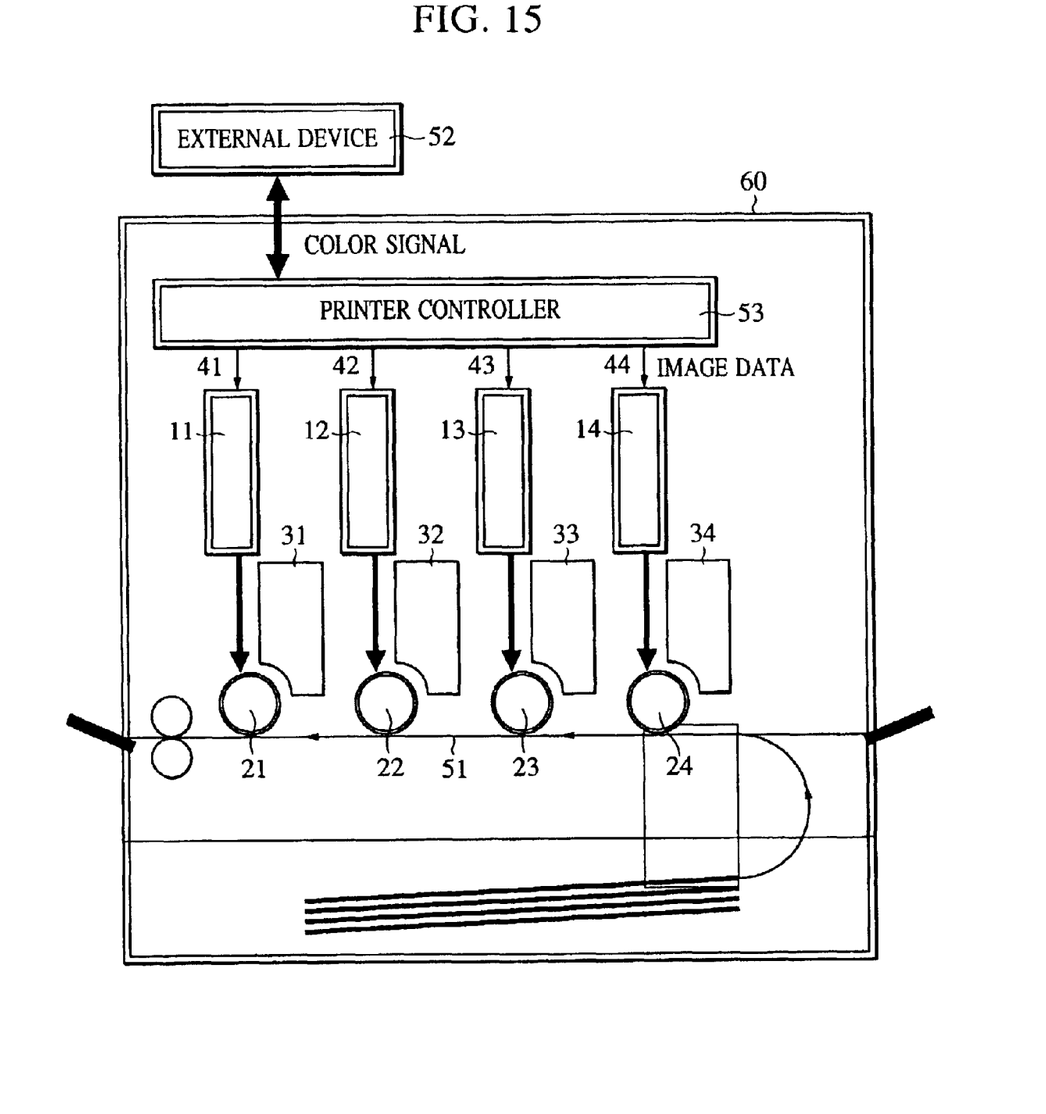
FIG. 15 is a schematic view of a color image forming apparatus to which the optical scanner of the second embodiment is applied.

FIG. 15 is a partial schematic view of a color image forming apparatus of an embodiment of the present invention. This embodiment covers a tandem type color image forming apparatus which records image information on the surface of photosensitive drums serving as image carriers by means of four scanning optical units arranged in parallel. In FIG. 15, 60 represents a color image forming apparatus; 11, 12, 13 and 14, optical scanners having any of the configurations shown in the second embodiment; 21, 22, 13 and 14, photosensitive drums serving as image carriers; 31, 32, 33 and 34, developers; and 51, a conveyor belt.

In FIG. 15, color signals R (red), G (green), and B (blue) are entered into the color image forming apparatus 60 from an external device 52 such as a personal computer. These color signals are converted into image data (dot data) of C (cyan), M (magenta), Y (yellow), and B (black) by a printer controller provided in the apparatus. The image data is entered into the optical scanners 11, 12, 13 and 14, respectively. Light beams 41, 42, 43 and 44 modulated in response to the individual image data are emitted from these optical scanners. The photosensitive surfaces of the photosensitive drums 21, 22, 23 and 24 are scanned by these light beams in the main scanning direction Y.

In the color image forming apparatus in this embodiment, four optical scanners (11, 12, 13 and 14) are arranged so as to correspond to colors C (cyan), M (magenta), Y (yellow) and B (black) to record image signals onto the surfaces of the photosensitive drums 21, 22, 23 and 24 in parallel and print a color image at a high speed.

In the color image forming apparatus of this embodiment, latent images of the individual colors are formed on the surfaces of the corresponding photosensitive drums 21, 22, 23 and 24 by use of light beams based on the respective image data by means of the four optical scanners 11, 12, 13 and 14, as described above. Then, the latent images are multi-transferred onto a recording medium, thereby forming a full-color image.

As the above-mentioned external device, for example, a color image reader having a CCD sensor may be used. In this case, this color image reader and the color image forming apparatus 60 form a color digital copying machine.

The present invention is of course applicable also to a monochromatic image forming apparatus having a single photosensitive drum.

According to the present invention, as described above, a sink mark can be selectively produced in a concave portion in the non-effective area, thus obtaining a plastic lens rarely suffering from birefringence, and having an excellent surface accuracy of the optical surface. Because of the presence of a portion having a slight GI, a plastic lens with only a slight amount of focal displacement can be obtained. Since cooling is accelerated at the concave portion during cooling after forming, it is possible to reduce the forming cycle.

In addition, according to the fθ lens serving as the scanning lens used in the optical scanner of the invention, in which the concave portion is formed in the non-effective area through which the scanning flux does not pass, the adverse effect of GI (refractive index distribution) can be reduced for the lens as a whole, and there is also available an advantage of reducing the focal displacement in the sub-scanning direction caused by the gradient of refractive index in the lens.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A molded lens used in an optical system of an image recorder, wherein:

at least a part of a non-effective area through which an image forming flux does not pass, has a concave shape, an outer portion of said lens has a refractive index greater than an inner portion of said lens, said lens is plastic, and when it is assumed that the focal length is f0 in a direction of a line perpendicular to the generating line, calculable from the lens surface curvature, the refractive index of the material, and the optical axis direction thickness of said lens; that the observed focal length in a direction of the line perpendicular to the generating line is f1; and that $\Delta f$ is defined by $|f1-f0|=\Delta f$, then $\Delta f/f0$ of an image forming flux passing through the effective area of said lens is 5% or smaller.

2. A molded lens according to claim 1, wherein said molded lens has a sink mark in said concave portion.

3. A molded lens according to claim 1, wherein said lens has a center thickness d and a lens height h at the concave portion, and d>h.

4. A molded lens according to claim 1, wherein f1 and f0 satisfy the relationship f1>f0.

5. A molded scanning lens, wherein:

within the sub-scanning section, at least a part of the non-effective area through which the scanning flux does not pass is convex in shape, an outer portion of said lens has a refractive index greater than an inner portion of said lens, said lens is plastic, and when it is assumed that the sub-scanning direction focal length is f0, calculable from the lens surface curvature, the refractive index of the material, and the optical axis direction thickness of said lens; that the observed sub-scanning direction focal length is f1, and that $\Delta f$ corresponds to $|f1-f0|=\Delta f$, then $\Delta f/f0$ of a scanning flux passing through the effective area of said lens is 5% or smaller.

6. A scanning lens according to claim 5, wherein said scanning lens has a sink mark in said concave portion.

7. A scanning lens according to claim 5, wherein said lens has a center thickness d and a lens height h at the concave portion, and d>h.

8. An optical scanner having a scanning lens according to claim 5, and having light source means and deflecting means which deflection-scans a scanning flux emitted from a light emitting section of said light source means onto a surface to be scanned.

9. An image forming apparatus comprising an optical scanner according to claim 8;

a photosensitive member arranged on said surface to be scanned;

a developer which develops a toner image from an electrostatic latent image formed on said photosensitive member by the flux;

a transfer unit which transfers said developed toner image onto a material receiving the transferred toner image; and a fixing unit for fixing the transferred toner image onto the material receiving the image.

10. An image forming apparatus comprising an optical scanner according to claim 8, and a printer controller which converts code data entered from an external device into an image signal, and enters the same into said optical scanner.

11. A scanning lens according to claim 5, wherein f1 and f0 satisfy the relationship f1>f0.

* * * * *